July 22, 1930.  E. H. REMDE  1,771,060
INDUSTRIAL TRUCK
Filed Aug. 14, 1925    4 Sheets-Sheet 4

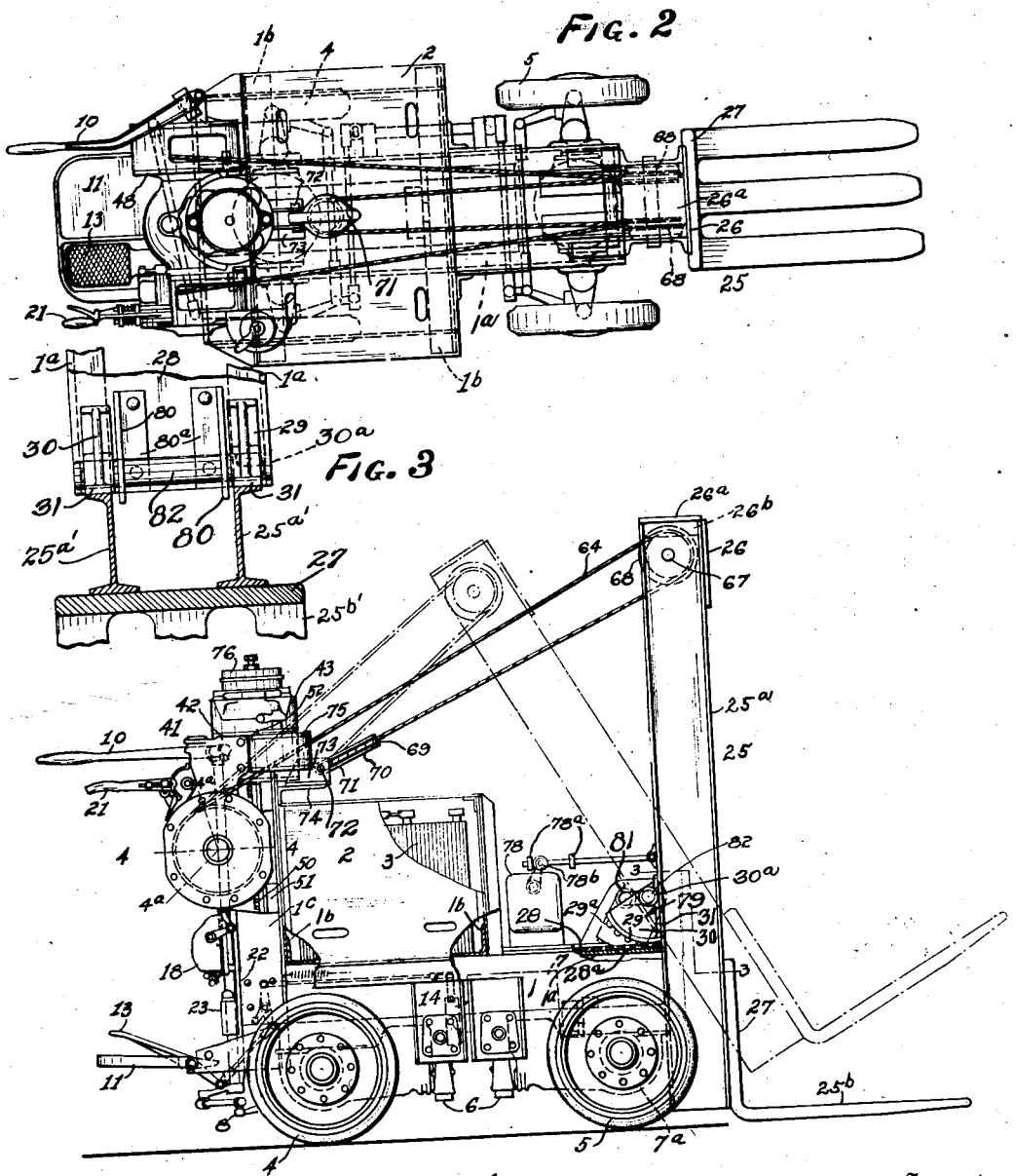

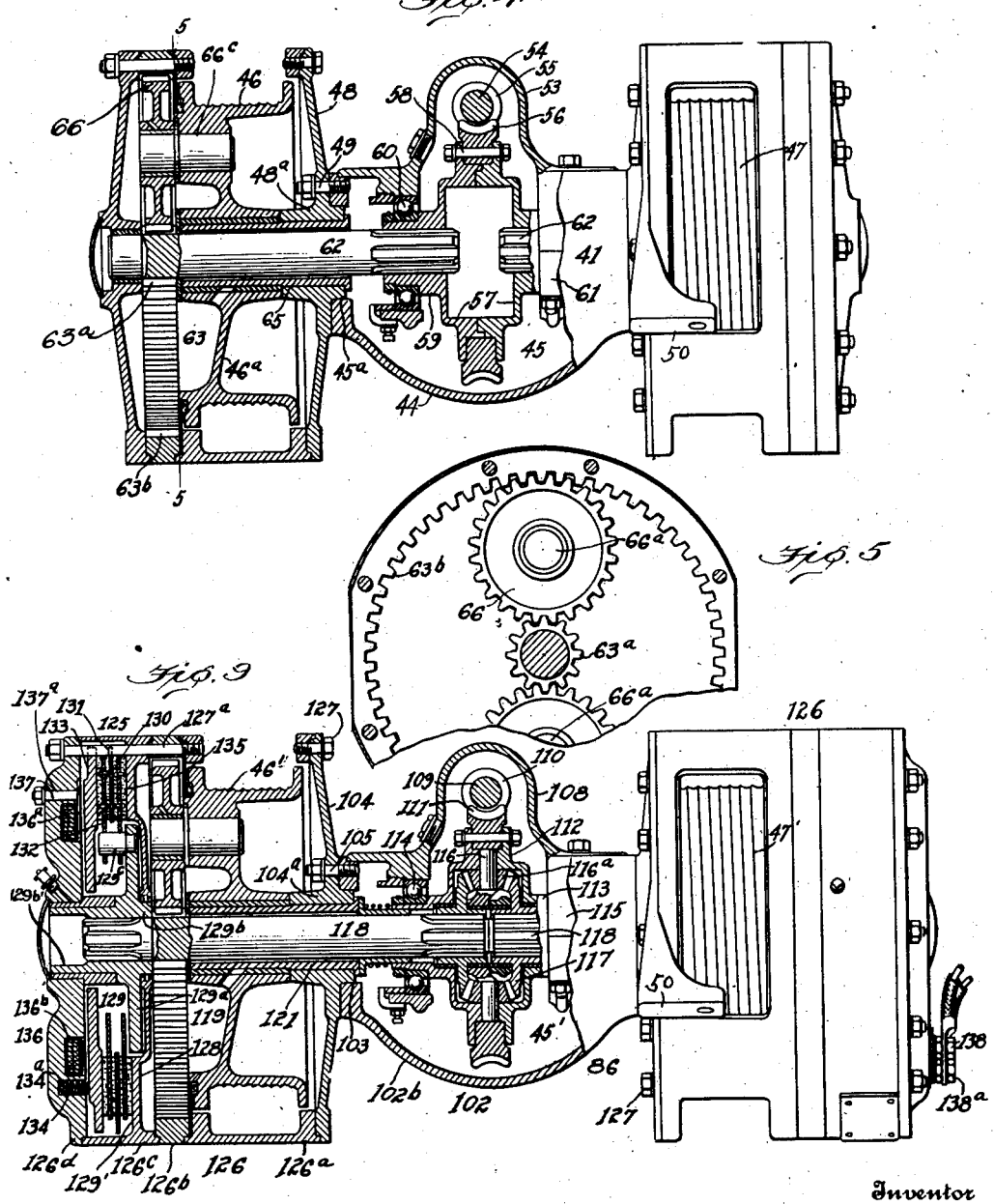

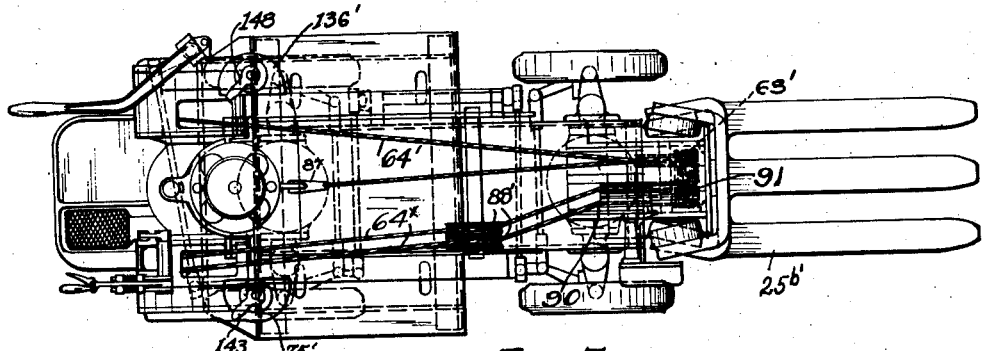
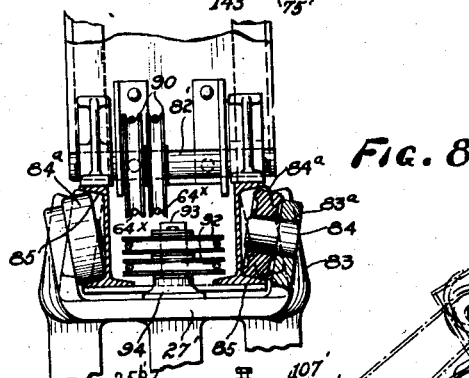
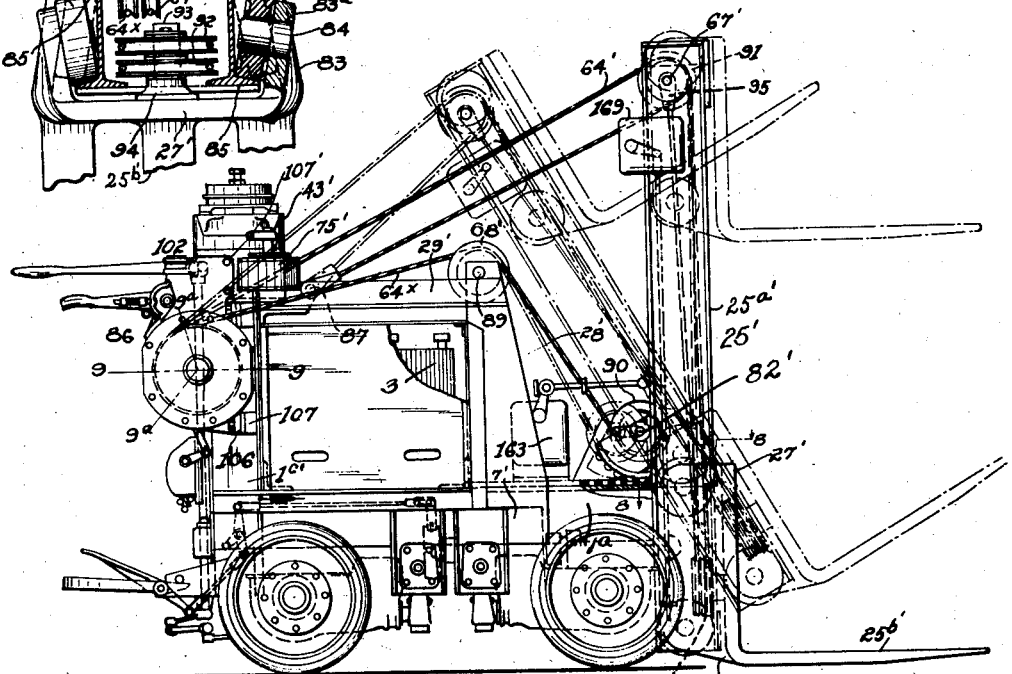

Inventor
Edward H. Remde
By Edward R. Alexander
Attorney

Patented July 22, 1930

1,771,060

UNITED STATES PATENT OFFICE

EDWARD H. REMDE, OF CLEVELAND, OHIO, ASSIGNOR TO THE BAKER-RAULANG COMPANY, OF CLEVELAND, OHIO, A CORPORATION OF OHIO

INDUSTRIAL TRUCK

Application filed August 14, 1925. Serial No. 50,305.

This invention relates to an industrial truck capable of lifting, transporting and positioning various kinds and shapes of bodies, for example, rolls of paper, barrels, drums, boxes and the like and castings.

One object of the invention is to provide a truck of this character having a body engaging and carrying member and improved means for supporting and moving said member, whereby the body to be engaged and transported or positioned is readily handled without undue strain on the truck frame or the engaging and carrying member.

A further object of the invention is to provide a truck of this character having at one end of its frame a body engaging and carrying member and improved means for movably supporting said member, whereby it may be positioned to permit operation of the truck in relatively small areas or to pass obstructions.

Another object of the invention is to construct an industrial truck having at one end of its frame a load engaging and carrying member mounted to tilt or roll on the truck frame, whereby the load, when elevated, may be shifted to a position over the truck wheels and driving and steering of the truck facilitated.

A further object of the invention is to construct a truck of the tiering type wherein the vertical guides may be swung inwardly to position the load over or substantially over the adjacent wheels of the truck, thereby facilitating the transporting of the load and turning of the truck.

Other objects of the invention will be apparent to those skilled in the art to which my invention relates from the following description taken in connection with the accompanying drawings, wherein:

Fig. 1 is a side elevation of a truck embodying my invention, parts being broken away.

Fig. 2 is a top plan view.

Fig. 3 is a section on the line 3—3 of Fig. 1.

Fig. 4 is a view of the power unit, partly on the line 4—4 and partly on the line $4^a$—$4^a$ of Fig. 1.

Fig. 5 is a section on the line 5—5 of Fig. 4.

Fig. 6 is a side elevation of a truck embodying my invention, but in which the construction of the load engaging and carrying member is modified so that the load supporting device or section thereof may be raised and lowered on the upright section thereof.

Fig. 7 is a top plan view of the parts shown in Fig. 6.

Fig. 8 is a section on the line 8—8 of Fig. 6.

Fig. 9 is a view of the power unit used in the form of construction shown in Figs. 6 and 7, partly on the line 9—9 and partly on the line $9^a$—$9^a$ of Fig. 6.

Figure 10:
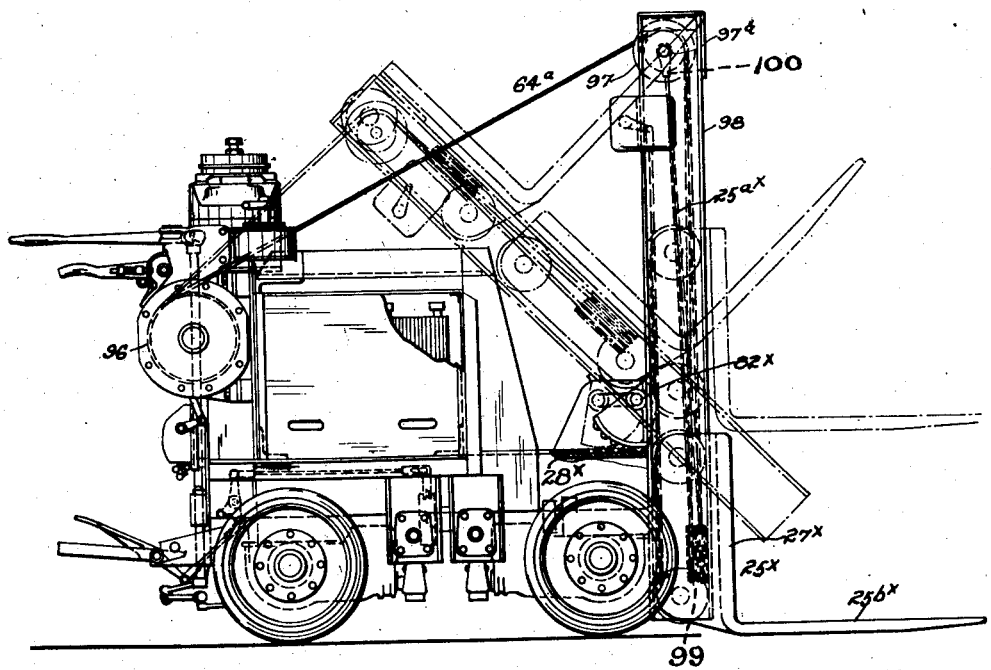
Fig. 10 is a side elevation of a truck embodying my invention, but showing a construction in which the load supporting device is raised and the upright section of the load carrying member is tilted automatically.

In the drawings, 1 indicates a frame of any desired shape and form, preferably constructed from structural members or elements, such as angle bars suitably connected by rivets or otherwise. The frame may comprise a pair of longitudinal members $1^a$, a pair of transverse members $1^b$, supported on and secured in a well known manner to the members $1^a$ and a pair of upright members $1^c$ secured in a well known manner to the members $1^a$ at or adjacent one end thereof, to wit, the driving end of the truck. The transverse members $1^b$ form a relatively wide support for the batteries 3. 4, 5 indicate pairs of wheels for supporting the frame 1, preferably of the same size and connected to the frame by suspension mechanisms 6. In the present form of construction, as shown in Fig. 1 of the drawings, only one pair of wheels (those designated at 5) are driven. For this purpose I provide an electric motor 7 connected through a suitable power transmission in a housing $7^a$ to the axle sections for the wheels 5; and by preference both wheels are steered simultaneously by connections, indicated as an entirety at 8, by means of an operating handle 10.

11 indicates a support on which the operative stands while operating the truck and the load supporting and engaging member 25 in the manner to be later described.

13 indicates a foot pedal associated with the platform 11, and arranged to control the release and application of a brake mechanism, indicated as an entirety at 14, in a well-known manner.

18 indicates as an entirety a controller for cutting in or closing the circuit to the motor 7 to operate it at different speeds and in opposite directions, by a handle 21, in a well known manner. 23 indicates as an entirety a safety switch mechanism associated with the controller 18 and brake mechanism 14, and automatically controlled by the latter in a well known manner.

The load engaging and carrying member 25 is arranged at that end of the frame 1 opposite to the platform 11 and mounted to roll thereon to shift the load, as well as to elevate it in the present form of construction. The member 25 comprises a main or upright section $25^a$ and a load supporting device or section $25^b$. In the preferred form of construction the device $25^b$ extends at substantially right angles to the main section and in the form of construction shown in Figs. 1, 2, and 3, it is rigidly secured to the lower end thereof. In this illustrated form of construction, the main section $25^a$ extends downwardly below the frame 1 so that the load supporting section may be readily positioned below the load to be lifted or tilted; it may extend upwardly any desired distance so as to accommodate bodies that are relatively high and also to provide for long leverage from the plate on which the member 25 rolls, whereby its operation may be readily effected without undue stress upon the frame or damage to the hoisting mechanism to be later described. The main section $25^a$ preferably comprises a pair of I-beams disposed parallel to each other and held in such relationship by tie plates 26, $26^a$ at their upper ends and at their lower ends by a plate 27 to which the tynes constituting the load supporting section $25^b$ are connected. The plate $26^a$ is preferably secured to the I-beams by angles $26^b$ (Fig. 1).

The supporting means for the member 25 comprises the following: 28 indicates a plate rigidly secured on the flanges of the angle members $1^a$ and preferably formed with two rows of spaced openings $28^a$ the walls of which constitute racks. 29 indicates a pair of arcuate members arranged to roll on the plate 28 and provided with teeth $29^a$ arranged to fit into or mesh with the openings $28^a$. Each arcuate member 29 is formed integrally with a web 30, provided with a flange 31, which is rigidly secured in any well known manner to the inner flange of the adjacent I-beam. From the foregoing description it will be seen that the arcuate members serve to support the I-beams on the frame members $1^a$ and permit the beams to roll thereon, so that the load engaging and carrying member 25 may bodily move thereon to the position shown in dotted lines in Fig. 1.

From Fig. 1, it will be noted that when the load engaging and carrying member 25 is in position to engage or discharge a load, the main or upright section $25^a$ is substantially in a vertical position and the supporting section $25^b$ is substantially parallel to the floor, so that by the operation of the truck on its wheels, the latter section will move into position below a load or in the reverse direction. If the supporting section $25^b$ is moved below a load and a pull imparted to the upper end of the main section $25^a$, the member 25 will roll on the plate 28 (see dotted lines in Fig. 1), the effect of which will be to raise and tilt the load. As shown, the load engaging and carrying member 25 is disposed relatively close to the wheels 5, so that when it is rolled inwardly on the plate 28, the load thereon will be shifted to a position substantially over these wheels.

The pull on the member 25 above referred to is effected by a mechanism preferably comprising the following instrumentalities: 41 indicates as an entirety a casting shaped and constructed to form a cradle 42 for a motor 43 and a housing section 44 for the power transmitting mechanism 45. The end walls of the housing section 44 are formed with openings $45^a$ through which the driving means for drums 46, 47, extend, as will be hereinafter described. The end walls of the openings $45^a$ are thickened to form suitable seats for a pair of annular supporting disks or members 48, and such walls and members are formed with aligned openings to receive cap screws 49 by means of which the disks or members 48 are rigidly secured to the end walls of the housing section 44. The supporting disks or members 48 are provided with integral extensions to provide feet 50, each of which is secured to an angle 51 carried by the adjacent upright member $1^c$. The feet 50 operate through the disks or members 48 and the housing and cradle casting 42 to support the motor 43 and power transmitting mechanism upon the frame 1. The motor 43 is fixed to the cradle 42 by a plurality of screws 52. 53 indicates a housing section shaped to fit upon the open end of the housing section 44 and be clamped thereto and also to enclose a worm shaft 54 connected to the shaft of the motor 43. The housing section 53 is adapted to support a pair of spaced bearings for the worm shaft. Between the worm shaft bearings, the shaft is provided with a worm 55 which meshes with and drives a gear 56 forming one of the elements of the power transmitting mechanism 45. 57, 57 indicate casings having flanges secured to the opposite faces of the gear 56 by bolts 58. The casings 57 are provided with hubs 59, which extend outwardly into and through suitable anti-friction bearings 60 mounted in blocks 61 carried by the housing section 53. The inner walls of the hubs 59 are splined or otherwise constructed and receive similarly shaped inner ends of shaft sections 62. Each of the axle sections 62, at its outer end, is connected by a reduction gearing, indicated as an entirety at 63, with the adjacent drum 46 or 47 to rotate it in one direction or the other to wind a cable 64 thereon or permit unwinding therefrom according to the direction of rotation of the motor 43. 65 indicates sleeves surrounding the axle sections 62 and supported at their inner ends in the openings extending through the hubs 48ª of the supporting disks or members 48, the inner free ends of the sleeves having flanges which abut against the inner end wall of the hubs 48ª to prevent movement of the sleeves outwardly. The outer ends or extended portions of the sleeves serve as bearings for the drums 46, 47, to rotate on, bushings being mounted on the sleeves to provide suitable bearing surfaces.

Each reduction gearing 63 comprises a pinion 63ª carried by the adjacent shaft section 62 and disposed in a plane beyond the outer face of the adjacent drum 46 or 47— see Fig. 4. The pinion 63ª is preferably formed integral with the shaft section 62. 66 indicates a pair of gears rotatably mounted on the outer side of the drum 46 (or 47), but eccentrically to its axis, the shafts 66ª for the gears 66 being preferably arranged in diametrical relation, as shown in Fig. 5. The gears 66 mesh at their inner portions with the pinion 63ª and at their outer portions with an internal ring gear 63ᵇ which is stationary, being connected to the adjacent disk 48 in the manner to be later set forth, so that when the shaft section 62 is driven the gears 66 are rotated on their axes and also caused to revolve about the axis of the shaft section, thereby rotating the adjacent drum at a speed which is lower than the speed of the shaft section—the ratio in the disclosed construction being substantially eight and one-half to one. The shafts 66ª for the planetary gears 66 are mounted in suitable openings 66ᶜ formed in thickened walls of the drum web 46ª.

As will be understood, both drums 46, 47, are operatively connected through the reduction gearings 63, shaft sections 62 and gearing 56, 55, with the motor 43.

The cables 64 are preferably formed from a single section of cable which is operatively connected to the load engaging and carrying member 25 to effect pull thereon preferably as follows: 67 indicates a shaft mounted at its opposite ends in openings formed in the I-beams of the main section 25ª. 68 indicates sheaves mounted on the shaft 67, and preferably spaced thereon to positions near the inner faces of the I-beams. 69 indicates a sheave mounted in a block 70. The block 70 is provided with a strap 71 looped around a cross shaft or pin 72 supported between a pair of angles 73, so that it may swing about the shaft 72. The angles 73 are secured to brackets 74, which in turn are secured to the front wall of the battery casing 2. The cable from one drum extends to and around one of the sheaves 68, then to and around the sheave 69 and then to and around the other sheave 68, from which it extends to the other drum. From the foregoing description it will be seen that when both drums are operated or driven together in either direction, both ends of the cable section are simultaneously wound on or off the drums and the pull on the cable ends is equalized. Accordingly, the pull exerted by both drums on the upper end of the main section 25ª and transmitted through the sheaves 68 will be equal at all times, thereby insuring rolling movement of the I-beams in a plane at right angles to the plate 28. It will also be noted that I provide between the driven shaft sections and the drum speed reduction gearing so that the motor 43 may exert maximum torque with a minimum consumption of current.

75 indicates a controller for the motor 43. 76 indicates a wheel fixed to the upper extended end of the shaft for the motor 43, the wheel being adapted to serve as a brake element for a suitable brake mechanism (not shown) preferably controlled by a solenoid having its winding connected in series with the motor, whereby the brake is released when the motor is set in operation.

78 indicates a limit switch mechanism preferably connected to one of the I-beams and serving to cut off current to the motor 43 when it reaches a predetermined position in its movement in either direction, such operation being effected by one of the tappets 78ª engaging with and moving the arm 78ᵇ.

The load supporting member 25ᵇ shown herein is adapted to be projected below a load when supported on a skid, bars or otherwise in elevated position, for which purpose it consists of one or more flat arms or tynes; but if desired it may be otherwise constructed or shaped according to the construction of the bodies to be engaged and lifted.

By providing on the arcuate members 29 teeth 29ª which fit into openings 28ª as they roll on the plate 28, I provide an interlock therebetween to prevent slippage between these elements and to insure rolling movement of both members equal distances.

79 indicates as an entirety means for maintaining the arcuate members in rolling engagement with the plate 28 at all times and for preventing lateral movement thereof. Of these means, 80 indicates a pair of upstanding plates having flanges 80ª secured to the plate 28. 81 indicates aligned elongated openings formed in the plates 80 and extending in a direction parallel to the plate 28 and arranged to receive a pin or shaft 82. The major axes of the openings 81 are spaced from the plate 28 a distance equal to the radius of the arcuate members from the centers on which they are struck for a purpose that will later appear. The pin 82 is loosely supported in openings 30ª formed in the webs 30 and project into and through the openings 81, so as to engage the walls of the latter. As will be understood and as shown in Fig. 1, the axis of the pin 82 coincides with the center on which the arcuate members 29 are struck, so that as the latter roll on the plate 28, the pin 82 will traverse the openings 81 and through the engagement with the walls thereof the latter will prevent displacement of the arcuate members 29 and thus maintain them in engagement with the plate 28 during rolling movement thereon; likewise, through engagement of the pin 82 with the end walls of the openings, positive stops are provided for limiting the rolling movement of the arcuate members in either direction. The plates 80 also prevent lateral movement of the arcuate members 29.

Referring to Figs. 6, 7, 8 and 9, I have shown a slightly modified form of construction, wherein the load supporting section of the load engaging and carrying member is movable along or slidably engages the main section thereof, for which purpose the latter is provided with guides, and the power unit is arranged to drive either drum in either direction, so that the main section may be rolled inwardly and outwardly, in the manner already set forth and the supporting section raised or lowered thereon. As a result of this form of construction, the truck may be used for carrying out additional operations, such as tiering loads, the load may be adjusted along the main section to so position its center of gravity that driving of the truck may be facilitated and the supporting section, either with or without a load may be positioned so that the total length of the truck will be shortened, in order that it may occupy less floor space and be turned in a relatively small area as well as to clear obstructions which would otherwise prevent manipulation of the truck.

In these views 25ᵇ′ indicates the supporting device section having a body portion 27′ to which the supporting arms or tynes may be integrally connected. The body portion 27′ has extended sides 83 formed with openings 83ª in which stud shafts 84 are mounted. The stud shafts 84 loosely carry rollers 84ª which engage the inner faces of the webs 85 of the I-beams constituting the main section 25ª′, whereby these webs serve as guides to slidably support the section 25ᵇ′ thereon. As shown, the lower rollers 84ª on the sides 83 engage the rear guides 85 and the upper rollers 84ª engage the front guides. As these guides are inclined opposite to each other and it is desirable to position each roller shaft 84 parallel to the guide with which its roller engages, each side 83 is twisted at its central portion so that its opposite ends will be at right angles to the planes of the adjacent webs 85 (see Fig. 8).

The power unit for swinging or rolling the load engaging and carrying member 25′ or for moving the supporting section 25ᵇ′ in either direction relative to the main section 25ª′ is indicated as an entirety at 86. Of this unit, 102 indicates a casting shaped and constructed to form a cradle for a motor 43′ and a housing section 102ᵇ for the power transmitting mechanism 45′. The end walls of the housing section 102ᵇ are formed with openings 103 through which the driving means for drums 46′, 47′, extend, as will be hereinafter described. The end walls of the openings 103 are thickened to form suitable seats for a pair of annular supporting disks or members 104, and such walls and members are formed with aligned openings to receive cap screws 105 by means of which the disks or members 104 are rigidly secured to the end walls of the housing section 102ᵇ. The supporting disks or members 104 are provided with integral extensions to provide feet 106, each of which is secured to an angle 107 carried by the adjacent upright member 1ᶜ′. The feet 106 operate through the disks or members 104 and the housing and cradle casting 102 to support the motor 43′ and power transmittting mechanism upon the frame members 1ᶜ′. The motor 43′ is fixed to the cradle by a plurality of screws 107′. 108 indicates a housing section shaped to fit upon the open end of the housing section 102ᵇ and be clamped thereto and also to enclose the worm shaft 109 connected to the shaft of the motor 43′. The housing section 108 is adapted to support a pair of spaced bearings for the worm shaft, and between these bearings the shaft is provided with a worm 110, which meshes with and drives a gear 111 forming one of the elements of the power transmitting mechanism 45′.

The power transmitting mechanism 45′ may be of any desired construction; but I prefer to use a differential mechanism of any desired form. In the illustrated form of construction, the differential mechanism comprises the main gear or worm gear 111, already referred to, connected to a casing 112 and having oppositely extending hubs 113. The hubs 113 are mounted in suitable bearings 114 seated in pillow blocks 115, carried by the housing section. The casing 112 supports a plurality of stud shafts 116, on which loosely rotate bevel pinions 116ª, meshing with bevel gears 117, splined in a well known manner to the inner ends of axle sections 118. Each of the axle sections 118 at its outer end is connected by a reduction gearing, indicated as an entirety at 119, with the adjacent drum 46′ or 47′ to rotate it in one direction or the other to wind a cable 64′ or 64ˣ thereon to permit unwinding therefrom according to the direction of rotation of the motor 43′. 121 indicates sleeves surrounding the axle sections 118 and extending through the hubs 104ᵃ of the supporting disks or members 104, the flanges on their inner ends abutting against the inner end walls of the hubs 104ᵃ to prevent movement of the sleeves outwardly. The outer ends or extended portions of the sleeves serve as bearings for the drums 46′, 47′, to rotate on, bushings being mounted on the sleeves to provide suitable bearing surfaces.

Each reduction gearing 119 is preferably similar in construction to the reduction gearing 63 already described in connection with the construction shown in Figs. 1 to 5, inclusive.

As will be understood, both drums 46′, 47′, are operatively connected through the reduction gearings 119, shaft sections 118 and differential mechanism 45′ with the motor 43′. Accordingly, by locking or holding one of the driven elements (or an element connected thereto) at either side of the differential mechanism 45′, the drum associated therewith will be held against movement and the power of the motor 43′, when set in operation, will be transmitted through the differential mechanism, the other shaft section and the adjacent reduction gearing 119 to rotate the drum connected to the latter, so that through the release of either locking means, the adjacent drum may be rotated.

In the illustrated form of construction I provide a locking or holding means 125 for each drum and such means are constructed to normally lock the adjacent drum or its driving means, so that both drums are normally held against movement. As a result of this arrangement, I provide and associate with each of the locking or holding means 125ᵃ releasing means (indicated as an entirety at 136) either of which may be operated, at will, by a selective mechanism so that either drum may be operated when the motor 43′ is driven.

Each locking or holding means 125 comprises the following instrumentalities: 126 indicates a casing rigidly connected to the disk 104, the latter element serving as one of the casing members and enclosing the inner face or side of the drum as shown in Fig. 9. The remaining members of the casing consist of a plurality of annular elements 126ᵃ, 126ᵇ and 126ᶜ and a plate 126ᵈ, all rigidly connected, the elements 104 and 126ᵃ being preferably secured together by a plurality of cap screws 127 and the elements 126ᵃ, 126ᵇ 126ᶜ and 126ᵈ being preferably secured together by bolts 127ᵃ. As shown, the casing element 126ᵇ is provided on its inner face with gear teeth (preferably formed integrally therewith) which constitute the internal ring gear of the speed reduction gearing 119. By making the casing 126 in sections, I provide for ready assembly and disassembly of the parts and elements, as well as insure economical manufacture. The casing element 126ᶜ is provided on its inner edge with a web or wall 128, the purpose of which is to provide one clutch face or disk 129′ of a multi-disk clutch indicated as an entirety at 129 and an outer wall for the chamber within which the reduction gearing 119 operates, thereby preventing the lubricant for the latter flowing into that part of the casing containing the clutch 129. The clutch 129 consists of a rotor 129ᵃ, preferably in the form of a plate having a hub 129ᵇ keyed in any suitable manner to the outer or free end of the shaft section 118 so as to be rotated thereby, and a plurality of laterally extending pins 129ᶜ disposed near the periphery of the plate and uniformly spaced therearound. 130, 131, 132, 133 indicate the remaining clutch disks, the disks 130 and 132 having openings to receive the pins 129ᶜ on which they are mounted to slide axially of the rotor 129ᵃ and to be rotated thereby and the disks 131 and 133 being formed with openings in their peripheries to receive the bolts 127ᵃ by means of which they are supported and guided for movement axially of the rotor 129ᵃ but held against rotation therewith. As shown, the disks 129′, 130, 131, 132 and 133 are arranged so that the center disk and outer or end disks are nonrotatively mounted and the remaining disks which rotate with the rotor are disposed between the nonrotative disks to insure maximum frictional engagement between them. The disk 133 is preferably in the form of an annular member and formed of soft iron to constitute an armature for a purpose which will later appear. As already set forth, the disks 130, 131, 132 and 133 are slidable or movable in a direction axially of the rotor 129ᵃ or shaft section relative to the disk 129′ and each other to effect a clutching or unclutching relation between all the disks. The disks 129′, 130, 131, 132 and 133 are preferably normally maintained in clutching relation by a plurality of expansion springs 134 mounted in recesses 134ᵃ formed in the inner face of the casing element 126ᵈ and normally acting against the annular member 133. By preference friction material 135 is interposed between the clutch disks to provide maximum friction therebetween, this material being preferably secured by rivets to the opposite faces of the disks 130 and 132. The releasing means 136 for releasing the clutch and disconnecting each drum from the adjacent locking or holding means 129, is preferably of the magnetic type, in which event the annular member 133 forms one magnetic element of such means—for example, the armature as already set forth; the other element thereof comprises a winding 136$^a$ (preferably of substantially annular shape) fitting a recess 136$^b$, formed in the inner face of the casing element 126$^d$. The winding 136$^a$ may be held in the recess 136$^b$ by headed bolts 137 mounted in openings 137$^a$ formed in the casing member 126$^d$, the heads of the bolts overlapping the winding 136$^a$ to hold it in the recess 136$^b$, as well as serving as a spacer between the winding 136$^a$ and armature 133 to maintain an air space between them and thus insure the release of the armature 133 from the winding following the de-energizing thereof. 138, 138$^a$, indicate the terminals for the winding 136$^a$ connected by leads to the batteries 3 in a well known manner.

The outer extended portion 129$^{b'}$ of the hub 129$^b$ rotatably fits into an opening formed in the casing member 126$^d$, the latter thereby forming a rigid bearing for the outer end of the shaft section 118 and preventing its disalignment while operating, and particularly in the event any of the clutch disks, when in clutching relation, assume a non-uniform engagement.

From the foregoing description it will be noted that each clutch 129 is interposed between the adjacent shaft section 118 and the casing 126 and the reduction gearing 119 for the adjacent drum is interposed between the latter and said shaft section, so that the mechanical advantage resulting from the provision of such gearing is effective and obtained in the driving of the drums by the motor 43' to roll the main section 25$^{a'}$ or to raise and lower the load supporting section 25$^{b'}$ since the pull incident to the weight of either section and the load thereon is transmitted through the drum, gearing 119, shaft section 118, rotor 129$^a$ and the rotatable clutch disks to the non-rotatable clutch disks. It will also be noted that by reason of such construction and arrangement, each clutch may be relatively small in diameter and comprise but few disks to sustain the maximum load for which the mechanism may be adapted to lift and transport.

It will also be understood from the foregoing description that the clutch disks of both clutches 129 are normally held in clutching relation by the springs 134 and operate to lock or hold both shaft sections 118 and both drums 46', 47', against rotative movement, and that either clutch may be released by selectively operating the magnetic means 136 by a selective mechanism 136', whereupon the adjacent drum will be operated upon the closing of the circuit to the motor 43'. I provide for this selective operation of either drum by a single motor by utilizing a differential mechanism to drive the drum shafts and taking advantage of the well known principle inherent in such mechanism, and operating either magnetic means 136 to release one of the clutches 129 so that either drum, as desired, may be driven. In the operation of the selective mechanism I connect the magnetic means in series with the motor 43', so that upon the operation of a controller 75', the release of the selected drum will be effected.

The circuits for the coils 136$^a$ and the switch and control devices therefor, are preferably arranged so that either coil may be connected in series with the motor, whereby the operation of the controller to drive the motor 43' in either direction will simultaneously effect the operation of either releasing means and the unlocking of the clutch acted on thereby to permit operation of the adjacent driving means. As a result, either drum 46', 47', may be rotated in one direction or the other to roll the section 25$^{a'}$ on the plate 28 or to raise or lower the load engaging device 25$^{b'}$, as desired. To carry out these operations, I provide a lever 143 which is connected to the controller 75' to supply current to the motor 43' and a lever 148 connected to the switch device or selective mechanism 136', the purpose of which is to select or connect either one of the coils 136$^a$ in series with the motor 43', so that upon the operation of the controller lever 143, the selected drum will be rotated in one direction or the other, according to the direction of movement of the lever 143.

The selector lever 148 is shown in a neutral position in Fig. 7, that is, that position in which neither coil 136$^a$ is connected in the circuit of the motor and batteries, but by movement of the lever to the right or left, one of the coils may be connected in the circuit as already described. This arrangement insures the complete cutting of current out of one coil and its de-energization before the other coil can be connected to it.

In this form of construction two cables 64', 64$^x$ are provided, the former being operatively connected to the main section 25$^{a'}$ and the latter being operatively connected to the load supporting device 25$^{b'}$. The cable 64' leads from the drum 46' to and around a sheave 68' on the shaft 67', its opposite end being connected to an anchor 87 comprising a rod secured in any desired manner to bars 29'. For raising and lowering the supporting device or section 25$^{b'}$, I preferably provide two cables 64$^x$ which simultaneously wind on and off the drum 47'. From this drum these cables run around sheaves 68' loosely mounted on a shaft 89 supported at the upper ends of plates 28', supported on the frame members 1$^{a'}$ and connected by the bars 29' with the uprights 1$^{c'}$, then around sheaves 90 loosely mounted on the shaft or pin 82' for the arcuate members 28', then around sheaves 91 mounted on the shaft 67' and then around sheaves 92 loosely mounted on a stud shaft 93 which is supported in and extends inwardly from a boss 94 carried on the inner face of the body portion 27'; from the sheaves 92, the cables extend to and are secured to suitable anchors 95 loosely mounted on the shaft 67'.

As will be understood from the foregoing description, the load is raised and lowered by winding the cables or ropes 64ˣ on or unwinding them from the drum 47' and the section 25ᵃ' is operated by winding the cable or rope 64' on or unwinding it from the drum 46'. The movement of each of these elements is automatically stopped when moved in either direction at a predetermined position by a mechanism which opens the circuit to the motor 43'. The mechanism for stopping the swinging or rotation of the section 25ᵃ' is indicated as an entirety at 163; and the mechanism for stopping the raising or lowering of the load is indicated as an entirety at 169. The switch means of these mechanisms forms the subject-matter of my co-pending application Serial No. 610,791, filed Jan. 5, 1923 (see Letters Patent No. 1,726,717), which is a division of application Serial No. 523,286, filed Dec. 12, 1921, for which reason they are not more fully illustrated and described.

The current for the motors 7' and 43' and for the coils 136ᵃ for the magnetic means 136 is supplied from the batteries 3. I have not shown herein the circuits and connections between the batteries and the controllers and selector switch mechanism, since the same is fully disclosed in my co-pending application Serial No. 749,141, filed Nov. 11, 1924 (see Letters Patent No. 1,725,968, dated Aug. 27, 1929), to which reference may be made.

In Fig. 10 I have shown an industrial truck having the load engaging device or section slidably mounted on the main section of the load engaging and carrying member, as shown in Figs. 6, 7 and 8, but provided with a hoisting or raising or lowering mechanism operatively connected with both the main section and the load supporting device or section in such manner that following the raising of the latter to or beyond a predetermined position, such mechanism will automatically swing or roll the main section inwardly; lowering of the load beyond such position will permit the main section to move or return to its first position.

In this form of construction the frame for the truck and supporting wheels and driving and steering, and also the load engaging and carrying member may be similar in construction to like parts and elements shown in Figs. 6, 7 and 8; and the power unit may be similar to that shown in Figs. 1, 2, 4 and 5, that is, a unit in which the cable winding drums rotate together in either direction to effect winding of the cable on and off thereof. The cables 64ᵃ lead from the drums 96 (only one being shown) to and around sheaves 97 mounted on a shaft 97ᵃ carried at the upper ends of and extending between the I-beams 98, which constitute the main section 25ᵃˣ of the load engaging and carrying member 25ˣ.

From the sheaves 97, the cables 64ᵃ extend to and around sheaves 99 mounted on the inner face of the body portion 27ˣ (these sheaves 99 being preferably mounted similar to the sheaves 92, as shown in Fig. 8); and then upwardly, their free ends being connected to anchors 100 loosely mounted on the shaft 97ᵃ.

The truck shown in Fig. 10 is operated to engage or discharge a load similar to that of the trucks shown in Figs. 1, 2, 6 and 7; but the load is raised and tilted in the following manner: The pull on the cables 64ᵃ is directed to and over the sheaves 97 and then downwardly to the load supporting device 25ᵇˣ. As the weight of this device and any load thereon is below the pivotal axis (shaft or pin 82ˣ) on which the main section 25ᵃˣ rolls, such weight will overbalance the pull exerted to raise the device 25ᵇˣ; accordingly, operation of the drums to wind the cables 64ᵃ thereon will raise the device 25ᵇˣ, but as the device moves toward the axis of the pin 82ˣ, this over-balance will decrease to zero, whereon the pull of the cables 64ᵃ, if continued, will effect the rolling of the main section 25ᵃˣ on the plate 28ˣ to the position shown in dotted lines in Fig. 10. If following such movement of the main section, the winding of the cables 64ᵃ is continued until the section abuts a positive stop, then the continued pull of the cables will be transmitted to the device 25ᵇˣ and thus effect movement thereof to any desired position along the I-beams—see dotted lines in Fig. 10. By paying out the cables 64ᵃ these elements will move in the reverse direction to their first position. By providing the main section 25ᵃˣ with a stop (which may be adjustable), it may be caused to move inwardly at any desired point below the zero point where the pull overcomes the weight of the supporting device 25ᵇˣ.

It will thus be seen that in this form of construction I provide for the raising of the load supporting device and the automatic tilting of the load by a single hoisting unit and mechanism.

To those skilled in the art to which my invention relates many alterations in construction and widely differing embodiments and applications of the invention will suggest themselves without departing from the spirit and scope thereof. The disclosures and the description herein are purely illustrative and are not intended to be in any sense limiting.

What I claim is:

1. In apparatus of the class described, the combination with a frame, wheels for supporting said frame and means for driving certain of said wheels, of a load engaging and carrying member mounted to roll inwardly and outwardly on said frame, said member comprising a main section having an arcuate member arranged to roll on said frame and a supporting section slidably mounted on said main section, a power driven drum, a sheave disposed at the upper end of said main section, a sheave mounted on an axis co-incident with the axis of said arcuate member, a flexible member arranged to wind on and off said drum and running around said sheaves and operatively connected to said supporting section, and power means connected to said load engaging and carrying member for operating it in one direction, whereby said member is moved inwardly to position the load over said frame.

2. In apparatus of the class described, the combination with a frame and wheels for supporting said frame, of a load engaging and carrying member comprising a main section and a load supporting section arranged at one end of said frame, an arcuate member secured to said main section intermediate its ends and mounted to roll on said frame, whereby said member may be moved inwardly, means for moving said main section to raise and tilt the load, whereby the latter is positioned substantially over the adjacent supporting wheels, and means between said member and frame for maintaining said arcuate member in engagement with the latter while rolling thereon.

3. In apparatus of the class described, the combination with a frame and wheels for supporting said frame, of a load engaging and carrying member comprising a main section having guides and a supporting section slidably engaging said guides, an arcuate member supporting said member on said frame and permitting it to roll inwardly thereon, and power mechanism comprising a motor, a pair of drums, transmission means between said motor and said drums, mechanism, including selective means, for controlling the operation of either drum and locking the other drum, and flexible members arranged to wind on and off said drums and operatively connected to said main section and said supporting section.

4. In apparatus of the class described, the combination with a frame and wheels for supporting said frame, of a load engaging and carrying member comprising a main section having guides and a supporting section slidably engaging said guides, an arcuate member supporting said member on said frame and permitting it to roll inwardly thereon, a pair of drums, means for driving said drums, a flexible member arranged to wind on and off one of said drums and operatively connected to said supporting section, and a flexible member arranged to wind on and off the other drum and operatively connected to said main section for rolling it.

5. In apparatus of the class described, the combination with a frame and wheels for supporting said frame, of a load engaging and carrying member comprising a main section having guides and a supporting section slidably engaging said guides, an arcuate member supporting said member on said frame and permitting it to roll inwardly thereon, a pair of drums, means for driving said drums, a sheave disposed at the upper end of said main section, a sheave mounted on an axis coincident with the axis of said arcuate member, a flexible member arranged to wind on and off one of said drums and running around said sheaves and operatively connected to said supporting section, and a flexible member arranged to wind on and off the other drum and operatively connected to said main section for rolling it.

6. In apparatus of the class described, the combination with a frame and wheels for supporting said frame, of a load engaging and carrying member comprising a main section having guides and a supporting section slidably engaging said guides, an arcuate member having rolling engagement with said frame for movably supporting said engaging and carrying member thereon, a power mechanism on said frame, means connected with said power mechanism for raising and lowering said supporting section relative to said main section irrespective of the position of said member on said frame, and separate means connected with said power mechanism for rolling said load engaging and carrying member on said frame.

7. In apparatus of the class described, the combination with a frame, wheels for supporting said frame and means for driving certain of said wheels, of a load engaging and carrying member comprising a main section having guides and a supporting section slidably engaging said guides, an arcuate member for supporting said member to roll on said frame, and mechanism for raising and lowering said supporting section relative to said main section, said mechanism having an operative connection with said main section and serving to roll it inwardly when said supporting section has been raised to a predetermined position.

8. In apparatus of the class described, the combination with a frame and wheels for supporting said frame, of a load engaging and carrying member comprising a main section having guides and a supporting section slidably engaging said guides, an arcuate member supporting said member on said frame and permitting it to roll inwardly thereon, a power mechanism comprising a motor, a pair of driven elements, transmission means between said motor and said elements, mechanism, including selective means, for controlling the operation of either element and locking the other element, and connections between said elements and said main section and supporting section, respectively.

9. In apparatus of the class described, the combination with a frame and wheels therefor, of a load carrying member having an arcuate element arranged to roll on said frame whereby said member is swingable inwardly and outwardly, a plate on said frame formed with an elongated slot disposed parallel to and spaced from said frame a distance equal to the radius of said arcuate element, and a pin carried by said arcuate element and disposed in line with the center on which it is curved and slidable in said slot.

10. In apparatus of the class described, the combination of a frame formed at one end with a longitudinally extending series of openings, wheels for supporting said frame, a load engaging and carrying member comprising a main section and a load supporting section, an arcuate member on said main section arranged to roll on said frame to swing said load engaging and carrying member inwardly, projections on said arcuate member fitting said openings and projecting therein as said arcuate member rolls on said frame, and means connected with said load engaging and carrying member for swinging it in one direction.

In testimony whereof, I have hereunto subscribed my name.

EDWARD H. REMDE.